(12) United States Patent
Rockwell et al.

(10) Patent No.: US 8,896,910 B2
(45) Date of Patent: Nov. 25, 2014

(54) COMPACT RAMAN GENERATOR WITH SYNCHRONIZED PULSES

(75) Inventors: David A. Rockwell, Culver City, CA (US); Vladimir V. Shkunov, San Pedro, CA (US)

(73) Assignee: Raytheon Company, Waltham, MA (US)

( * ) Notice: Subject to any disclaimer, the term of this patent is extended or adjusted under 35 U.S.C. 154(b) by 109 days.

(21) Appl. No.: 13/476,652

(22) Filed: May 21, 2012

(65) Prior Publication Data

US 2013/0308176 A1 Nov. 21, 2013

(51) Int. Cl.
*G02F 1/35* (2006.01)

(52) U.S. Cl.
USPC .......................................................... 359/327

(58) Field of Classification Search
USPC .......................................................... 359/327
See application file for complete search history.

(56) References Cited

U.S. PATENT DOCUMENTS

| | | | |
|---|---|---|---|
| 3,705,992 A * | 12/1972 | Ippen et al. .................... | 359/327 |
| 4,039,851 A | 8/1977 | Jain et al. | |
| 4,394,623 A | 7/1983 | Kurnit | |
| H0000015 H * | 1/1986 | Chraplyvy ........................ | 372/3 |
| 4,794,598 A * | 12/1988 | Desurvire et al. ................ | 372/3 |
| 4,933,943 A | 6/1990 | Narhi et al. | |
| 5,058,117 A | 10/1991 | Shoshan et al. | |
| 5,673,281 A * | 9/1997 | Byer ................................ | 372/3 |
| 7,420,994 B2 * | 9/2008 | Korolev et al. .................. | 372/3 |
| 7,991,022 B1 | 8/2011 | Soh et al. | |
| 8,345,717 B2 * | 1/2013 | Dekker et al. .................... | 372/3 |
| 2003/0043453 A1 | 3/2003 | Smith et al. | |
| 2004/0028090 A1 | 2/2004 | Pask et al. | |
| 2006/0187537 A1 | 8/2006 | Huber et al. | |
| 2010/0054284 A1 | 3/2010 | Dekker et al. | |
| 2013/0308177 A1 * | 11/2013 | Rockwell et al. ............. | 359/327 |

FOREIGN PATENT DOCUMENTS

WO    WO 2008/024145 A2    2/2008

OTHER PUBLICATIONS

Notification of Transmittal of the International Search Report and the Written Opinion of the International Searching Authority, or the Declaration dated Jun. 13, 2013 in connection with International Patent Application No. PCT/US2013/033350.

\* cited by examiner

*Primary Examiner* — Daniel Petkovsek

(57) ABSTRACT

According to an embodiment of the disclosure, a Raman generator includes a Raman medium and one or more optical elements. The Raman medium is configured to receive a pump pulse at a first wavelength and shift at least a portion of the pump pulse energy or power into a Stokes-shifted pulse at a second wavelength. The one or more optical elements are configured to synchronize one or more subsequent passages of the Stokes-shifted pulse through the Raman medium with one or more subsequent pump pulses at the first wavelength. The synchronized passage of the Stokes-shifted pulse and one or more subsequent pump pulses through the Raman medium increases a power of the Stoke-shifted pulse.

21 Claims, 3 Drawing Sheets

US 8,896,910 B2

COMPACT RAMAN GENERATOR WITH SYNCHRONIZED PULSES

TECHNICAL FIELD

The present disclosure is directed in general to lasers and more specifically to a nonlinear wavelength conversion using stimulated Raman scattering.

BACKGROUND OF THE DISCLOSURE

A variety of laser configurations are known. However, some of these include components that unnecessarily increase the size and complexity of particular laser configurations. Further, some laser configurations have unacceptable alignment requirements.

SUMMARY OF THE DISCLOSURE

To address one or more of the above deficiencies of the prior art, a Raman generator is provided with a Raman medium and one or more optical elements. The Raman medium is configured to receive a pump pulse at a first wavelength and shift at least a portion of the pump pulse energy or power into a Stokes-shifted pulse at a second wavelength. The one or more optical elements are configured to synchronize one or more subsequent passages of the Stokes-shifted pulse through the Raman medium with one or more subsequent pump pulses at the first wavelength. The synchronized passage of the Stokes-shifted pulse and one or more subsequent pump pulses through the Raman medium increases a power of the Stoke-shifted pulse.

Certain embodiments may provide various technical advantages depending on the implementation. For example, a technical advantage of some embodiments may include the capability to make multiple passes of the pump and Stokes-shifted beams through the Raman medium using an optical arrangement that will allow a long total path length through the crystal in a compact package characterized by a significantly shorter length. A technical advantage of other embodiments may include the capability to provide a compact Raman generator that is about 28 cm in length with a total optical path length that is about 90 cm. Another technical advantage may include the capability to have nine passes through a Raman crystal with only five components. Yet another technical advantage may include the ability to synchronize Stokes-shifted pulses with successive pump pulses to efficiently convert a train of pump pulses into a train of Stokes-shifted pulses.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
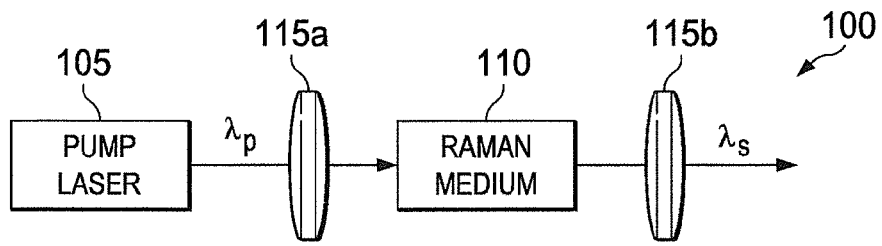
FIGS. 1A through 1D illustrate aspects of three general architectures for Raman devices.

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

This disclosure pertains to nonlinear wavelength conversion by using stimulated Raman scattering (SRS) in crystals or other classes of Raman media. According to this wavelength-conversion process, a portion of an initial "pump" laser beam generates a signal beam having a wavelength that is longer than the pump wavelength, and where this wavelength difference is determined by a characteristic frequency shift, or "Stokes shift," of the Raman medium. A principal objective of certain embodiments of the disclosure is to make multiple passes of the pump and Stokes-shifted beams through the Raman medium using an optical arrangement that will allow a long total path length through the crystal in a compact package characterized by a significantly shorter length. Three approaches for achieving multiple passes are provided. All three approaches are particularly advantageous if the pump beam comprises either a single sub-nsec pulse or a continuous train of such pulses.

As described herein, according to one embodiment, a compact, alignment-stable, multi-pass Raman generator accommodates a single sub-nsec pump pulse. An exemplary manifestation of this disclosure provides a total optical length of approximately 1 m in a package having a maximum dimension of approximately 30 cm. Additionally, in order to minimize the number of components to implement such a multi-pass scheme, certain embodiments are designed to have nine passes through a Raman crystal with only five components. Another feature of the certain embodiments is a design that minimizes the alignment sensitivity and complexity, while also recognizing that the pump and Stokes-shifted beams must generally be properly oriented relative to the crystal axes. Such is accomplished in certain embodiments with only two lenses and two lens-Porro prism combination components that require alignment relative to the Raman crystal.

As also described herein, according to another embodiment, a synchronously pumped Raman ring resonator is designed to accommodate a continuous train of sub-nsec pulses. This embodiment provides a design for resonator optics that allows the Stokes-shifted signal to make multiple passes through the ring resonator where the time between successive passes is tuned to match the inter-pulse period of the pump-pulse train. For each pass through the resonator, the Stokes-shifted pulse passes through the Raman medium synchronously with successive pump pulses. This allows the Stokes-shifted pulse to increase in power until it efficiently converts the subsequent train of pump pulses into a train of Stokes-shifted pulses. If the pump pulse train is modulated by a temporal envelope, such as a temporal burst of pump pulses 2 to 100 nsec long at a burst rate of 10 kHz, this embodiment will yield individual sub-nsec Stokes-shifted pulses at repetition frequency of 10 kHz.

As also described herein, according to yet another embodiment, a synchronously pumped linear Raman resonator is designed to operate in a manner similar to the synchronously pumped Raman ring resonator. More specifically, the Stokes-shifted pulse passes through the Raman medium synchronously with successive pump pulses; however, rather than bypass the Raman medium for subsequent passage with a synchronized pulse, the Stokes shifted pulse passes directly through the Raman medium in a linear fashion for subsequent passage with a synchronized pulse.

Stimulated Raman scattering is a well known means for shifting a laser wavelength from that of a pump laser to a longer wavelength. If the pump laser happens to be tunable, the SRS process can shift the tunability from the pump-laser wavelength range to a longer wavelength range. Certain embodiments of the present disclosure are particularly useful in meeting requirements for multiple wavelengths in the mid-infrared wavelength range, roughly from 2 to 5 μm.

Particular applications in the mid-infrared wavelength range require continuous tuning while other applications only require a few discrete wavelengths located in atmospheric transmission windows. However, solid-state crystals for mid-infrared (mid-IR) applications (wavelength 2 μm to 5 μm) have maximum lengths around 10 cm. Therefore, a problem arises as efficient Raman conversion often requires lengths of several meters.

Given such problems, certain embodiments teach how optical beams can be folded and routed through a single crystal for many passes in a compact package with minimal alignment sensitivity. According to one embodiment, a compact, alignment-stable, multi-pass Raman generator accomplishes this performance by using relay imaging between successive passes, which periodically compensates for diffractive spreading of the pump and Stokes-shifted beams, and by using Porro prisms to fold the beams between successive passes. Porro prisms are particularly suitable for such folding functions because they are alignment insensitive in one direction. According to another embodiment, a synchronously pumped Raman ring resonator comprises a compact ring resonator containing only four alignment-sensitive reflecting surfaces, two of which are dichroics or polarization beam splitters (for the case in which the pump and Stokes-shifted beams are orthogonally polarized) and two of which provide total reflection at the Stokes-shifted wavelength. According to yet another embodiment, a synchronously pumped linear Raman resonator operates in a manner similar to the synchronously pumped Raman ring resonator. However, rather than bypass the Raman medium for subsequent passage with a synchronized pulse, the Stokes shifted pulse passes directly through the Raman medium in a linear fashion for subsequent passage with a synchronized pulse.

To provide additional context for embodiments of the disclosure, three general architectures for Raman devices are described below: a single pass Raman generator, a Raman resonator, and a multi-pass Raman generator.

The first general architecture for Raman devices, a single pass Raman generator 100, is shown in FIG. 1A. The Raman generator 100 includes a pump laser 105, a Raman medium 110, and one or more relay imaging optic lenses 115a, 115b. The Raman generator 100 is configured to pass a pump beam through a portion of the Raman medium 110 and each of the lenses 115 to generate a Stokes-shifted beam.

In the single-pass Raman generator 100, the pump laser 105 launches a pump beam at wavelength $\lambda_p$ into the Raman medium 110. The Stokes-shifted signal at wavelength $\lambda_s$ builds up from spontaneous Raman scattering. For long enough path lengths, at least 50% of the pump energy can be converted to the Stokes-shifted wavelength. This approach is conceptually very simple, but the available Raman media for mid-IR wavelength generation require path lengths of several meters for acceptable Raman conversion efficiency, while crystal lengths are limited to approximately 10 cm. Therefore, a single pass through a single crystal is well below threshold and of essentially no utility in most particular applications. One could employ a long string of Raman crystals with relay optics between crystals to convey the optical beams from one crystal to the next, but this would be hopelessly complex, large, and subject to multiple misalignment degrees of freedom.

Figure 1B:
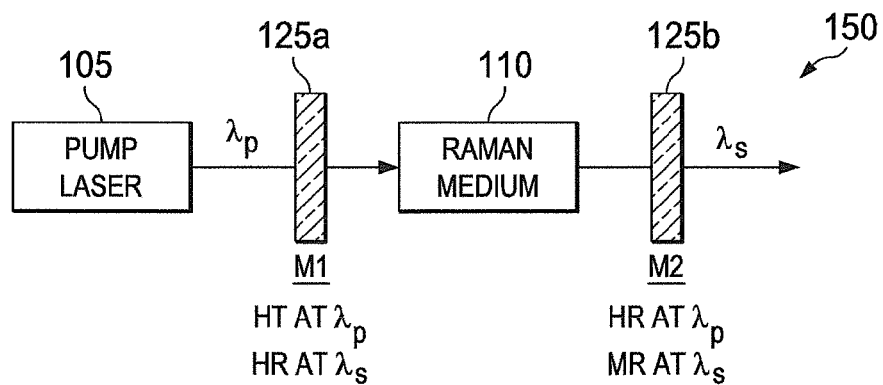

The second general architecture for Raman devices, a Raman resonator 150, is shown in FIG. 1B. The Raman resonator 150 encloses the Raman medium 110 between two mirrors 125a, 125b that reflect the Stokes-shifted wavelength back and forth in the Raman medium 110. As in any laser resonator, the mirrors 125a, 125b are designed such that the multiple passes overlap in the Raman medium, and they reflect the Stokes-shifted wavelength as required. Mirror 125a (M1) typically has 100% transmission at the pump wavelength and 100% reflectivity at the Stokes-shifted wavelength, and mirror 125b (M2) has a lower reflectivity, perhaps 50%, at the Stokes-shifted wavelength. The Raman conversion builds up from spontaneous Raman scattering, and if the design is properly implemented Raman conversion efficiencies >50% are routinely achieved. One potential limitation of the Raman resonator 150 for some applications is that the resonator necessarily reduces the allowable bandwidth of the Stokes-shifted output beam, depending on the finesse (or Q-factor) of the optical resonator. In other applications, this spectral narrowing might be a feature.

A limitation of the Raman resonator 150 that is addressed by certain embodiments of the present disclosure arises because desired conversion efficiencies of approximately 50% or more are only possible if the pump pulse length is much greater than the round-trip propagation time through the resonator. This transient phenomenon can be understood in the following way. Raman-laser operation begins with very weak spontaneous emission that is amplified as it propagates back and forth between the resonator mirrors. With a sufficiently long pump-pulse length, the Stokes-shifted signal is allowed to make a large number of round trips through the Raman medium, to the point that the energy conversion efficiency from the pump to the Stokes-shifted wavelength can reach practical levels of approximately 50% or more. However, if the pump-pulse duration is not long enough to allow that many round-trips, the conversion efficiency suffers. As a specific example, if the resonator optical length is 15 cm, the round-trip time will be approximately 1 nsec, and the pump pulse length will have to be at least approximately 20-30 nsec for effective Raman conversion. This clearly rules out applications for a single sub-nsec pump pulse. Embodiments of the compact multi-pass Raman generator disclosed herein address this limitation of the Raman resonator in which the pump and Stokes-shifted signal propagate together throughout all of the multiple passes. As long as the product of the pump intensity and crystal length is sufficiently high, as described in certain embodiments, very short pulse lengths can be accommodated. The case of a pump waveform comprising a long sequence of sub-nsec pulses is addressed by the synchronously pumped Raman ring resonator (described with reference to FIG. 4), or the synchronously pumped Raman linear resonator (described with reference to FIG. 5), which essentially stretch the pump into a long train of pulses with the total temporal length of the pulse train being long enough to avoid the transient issue mentioned above.

Figure 1C:
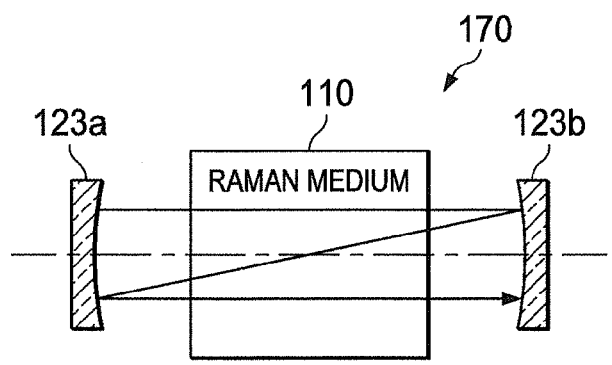

The third general architecture for Raman devices, a multi-pass Raman generator (MPG) 170, is shown in FIG. 1C. The multi-pass Raman generator 170 shown in FIG. 1C is a modification of the arrangement of FIG. 1A such that the pump and Stokes-shifted beams are folded around so they make multiple passes through the same crystal. This type of Raman generator has been employed for more than thirty years, and a good description has been published by Trutna and Byer in "Multi-pass Raman gain cell," Appl. OPT 19, 301 (1978). The MPG provides a long optical path length with periodic refocusing to enhance Raman conversion. The MPG looks similar to the Raman resonator 150 of FIG. 1B. However, as seen in FIG. 1C, the mirrors 123a, 123b are curved and they have high reflectivity for all wavelengths of interest. The mirror spacing may also be adjusted with respect to the radii of curvature such that the resonator meets the well known conditions for stability. Rather than having all passes overlap in the Raman medium as is the case for FIG. 1C, in certain embodiments of the disclosure, as will be detailed below, reflectors may be designed to provide multiple passes that do not overlap.

Figure 1D:
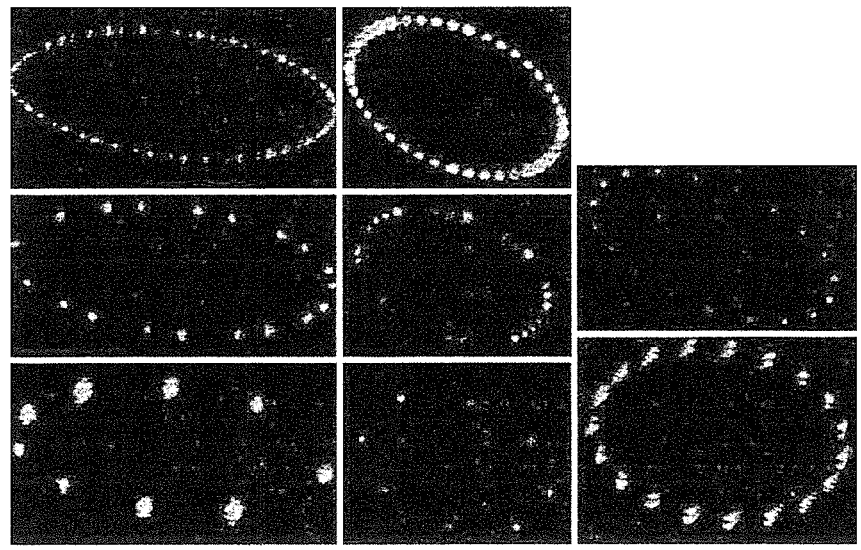

MPG operation is based on the fact that a light beam injected off-axis into such a stable optical resonator bounces back and forth between the mirrors, and as the beam makes successive passes through the resonator, the location where the beam reflects off the mirrors systematically moves around the mirror surface, typically forming a circular path near the rim of the mirrors with the center of the circle aligned along the longitudinal symmetry axis of the two-mirror resonator. That is, the beam spot "walks" around the mirror surface before being coupled out. FIG. 1D illustrates representative patterns that can be produced. After the desired number of round trips, the beam is deflected out of the MPG by means of a pick-off mirror or some similar approach. Trutna and Byer made a gas cell Raman medium that had 25 passes.

MPGs have only been implemented with gaseous Raman media, which can occupy as large as volume as can be designed to contain the required high-pressure gas. Trutna and Byer constructed a cell that was nearly 4 m long, the mirror radii of curvature were 2 m, and the mirror diameters were 12.7 cm.

Solid-state Raman crystals cannot be made arbitrarily large, and they are typically limited to cm-scale transverse dimensions and lengths of approximately 10 cm. For high-power operation (areas of interest for particular embodiments), solid-state laser media typically have a high-aspect ratio rectangular cross section for effective heat removal with minimal thermo-optical distortions. For example, a crystalline Raman medium might have dimensions of 1×10×100 mm. To adapt the MPG concept to such a crystalline slab, the 2-D pattern of mirror reflections would have to be collapsed into a single plane, in which case all passes through the Raman medium would overlap at the same axial location at the center of the Raman medium. This would greatly enhance the beam intensities at that common focus, such that the SRS interaction length would be approximately equal to the confocal parameter for the geometry used. Given the short length of the Raman medium and the short mirror focal lengths, the effective interaction length might extend just a few centimeters on either side of the focus. In addition, the very high intensity at this focus would run a serious risk of bulk damage. In contrast to such scenarios, certain embodiments of the disclosure teach how to maintain essentially constant beam intensity throughout the entire interaction length, such that the intensity can be much lower while still achieving a sufficiently high intensity-length product to generate efficient Raman conversion. Moreover, certain embodiments teach how the optical power and the heat load can be distributed such that they essentially fill the entire Raman-crystal volume. This allows more effective heat removal and, hence, power scaling.

Embodiments of the present disclosure simultaneously fold a pump beam and Raman-shifted Stokes beam so that the two beams remain collinear and they make multiple passes through the Raman generator. Although in certain embodiments disclosed herein the Raman medium will be described as a crystal, other media may avail from teachings of the disclosure. In certain embodiments, the total path length can be approximately 1 m or more. Additionally, if longer path lengths are required for specific applications, wider crystals may be used or several of the described Raman modules may be arranged in series to provide the total path length required.

Configurations for certain embodiments may be designed to take into consideration certain requirements:

1. Due to diffraction, the pump and Stokes-shifted beams will spread as they propagate along the multi-pass architecture. If this spreading is not compensated, the average beam intensities will monotonically decrease along the propagation length, reducing the Raman conversion efficiency. Hence, embodiments of the present disclosure employ an optical scheme to limit the diffractive beam spreading to a tolerable level.
2. For crystalline Raman media, it is often necessary that the optical beam propagation directions and the beam polarizations must be properly oriented relative to the crystalline axes. Therefore, embodiments of the present disclosure are configured such that the multiple-passes through the Raman medium are parallel (or anti-parallel) to each other, such that if one beam is properly oriented, all beams are.
3. The overall multi-pass architecture is capable of being folded to form a compact package, with a goal of a maximum dimension being ~30 cm.

Figure 2A:
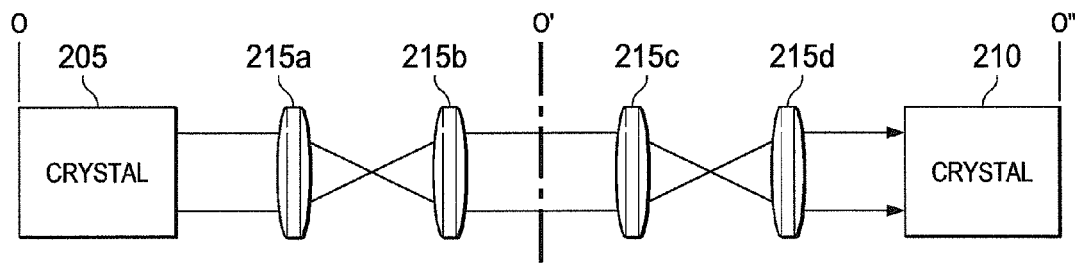
FIG. 2A through 2C illustrates teaching concepts for embodiments of the disclosure.

In order to comprehend the multi-pass architecture of certain embodiments of the disclosure, it is best to begin by considering the conceptually simple case of two Raman crystals 205, 210 in series, as is schematically indicated in FIG. 2A. Lenses 215a and 215b form an image of plane O at plane O', and lenses 215c and 215d form an image of O' at O". The objective of the relay imaging lenses 215a-215d is to compensate for diffraction spreading. Specifically, any spreading that arises as the pump and Stokes-shifted beams propagate is eliminated as an image of plane O is formed at plane O'. The same compensation arises again as the beams propagate from O' to O". Hence, the first of the above-referenced requirements is satisfied, providing the propagation distance from one image plane to the next corresponds to a high Fresnel number (i.e., minimal diffractive spreading). For a 100 mm crystal length and a refractive index of 2, the Fresnel number is about five for a wavelength of 2 μm. Although only two beam paths are shown in FIG. 2A (originating at the top and bottom of the crystal), it will be understood that any ray leaving the exit face of the first crystal 205 can be imaged into a similar location in the entrance face of the second crystal 210.

This same type of relay imaging could be continued for additional crystals in series to achieve a sufficient mid-infrared (mid-IR) wavelength generation. However, such a scheme will often not be compact, as is specified in third requirement above. Additionally, in order for the intensity of each beam to be high enough to yield efficient Raman conversion, the beam spot sizes often need to be small, such as about 0.5 mm to 1 mm diameter. Therefore, a single beam passing a single time through a Raman crystal typically uses only a small fraction of the total crystal volume. For example, if the beam size is 1 mm and the crystal height is 10 mm, a single pass through the crystal uses only 10% of the total crystal volume. Hence, the beams often need to be routed back to the beginning of the first crystal 205 for multiple additional passes through the crystal for a total of about ten passes. Furthermore, when the beam returns, the beam can enter a different portion of the crystal than any of the previous passes so that each pass is independent of all other passes.

Figure 2B:
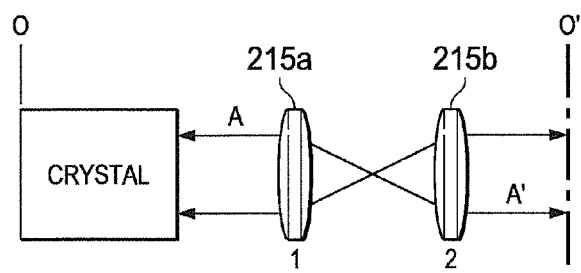

A first step in approaching the desired multi-pass architecture is to consider what happens if we place a mirror at the plane O'. This case is illustrated in FIG. 2B. This scheme allows the beams to go back through the crystal for a second pass; however, the first and second passes overlap. Specifically, due to the inverting properties of the relay lenses, a ray at A propagating to the right is imaged to A' at the image plane O'; if that ray is reflected by 180 degrees, it returns to A. Further details below describe how the overlap problem can be eliminated, but for now we see that the scheme of FIG. 2B meets the first requirement above, namely that the input plane O of the Raman crystal is imaged onto itself in one round-trip through the optical path.

Figure 2C:
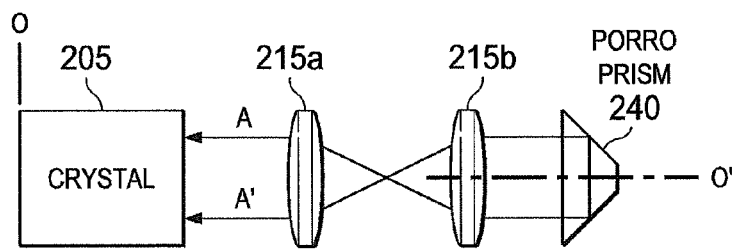

The next step is to replace the mirror at O' with a Porro prism 240, as shown in FIG. 2C. The Porro prism 240 is located such that the image plane O' has been moved to the center of the Porro prism 240, and the two total internal reflections (TIRs) from the prism 240 invert the image plan by 180 degrees. In this configuration, the inverting property of the prism 240 prevents a beam at position A from returning exactly upon itself. That is, this scheme takes a ray at position A and directs it as a ray at position A'. As shown in FIG. 2C, positions A and A' are located symmetrically relative to the longitudinal symmetry axis of the optical arrangement. Due to the imaging incorporated in this scheme, when ray at plane O propagates through the crystal to position A, then propagates to plane O' and back to A', and then propagates back to plane O, it will be an image of the original input beam, but the image will be inverted and displaced downward, thereby satisfying the first requirement above.

The next step is to add to the left side of the crystal another combination of two lenses and a Porro prism similar to the combination shown in FIG. 2C, but with the vertical heights being reduced by the thickness of a single pass through the crystal. For example, if the beam height, d, is 1 mm and the total crystal height is 10 mm, the second set of lenses and Porro prism will be 10% shorter than the first set. This leads to the arrangement shown in FIG. 3, where the two imaging lenses associated with each Porro prism (e.g., the lenses shown in FIG. 2C) are not shown for simplicity.

Figure 3:
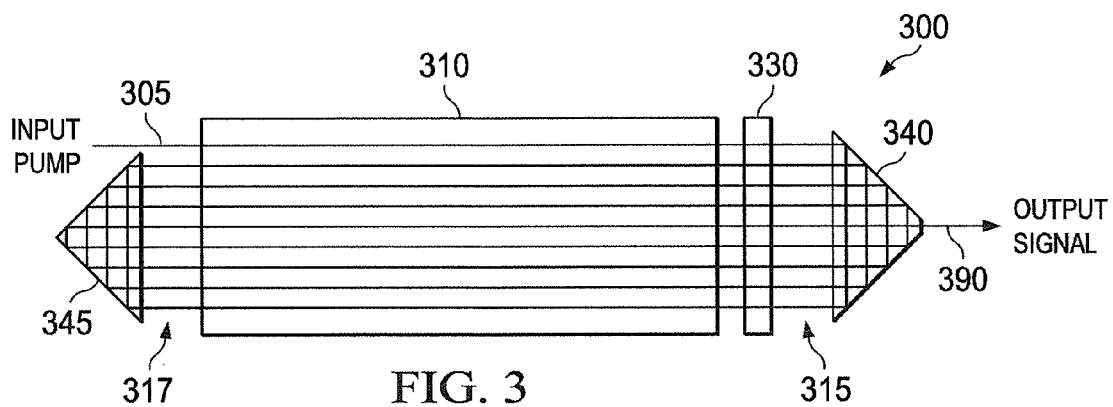
FIG. 3 illustrates a compact Raman generator according to an embodiment of the present disclosure.

FIG. 3 illustrates a compact Raman generator 300 according to an embodiment of the present disclosure. Although certain details will be provided with reference to the components of the Raman generator 300 of FIG. 3, it should be understood that other embodiments may include more, less, or different components. Additionally, it should be understood that certain components have not been shown for ease of explanation.

The Raman generator 300 is generally shown receiving an input/pump pulse 305 (e.g., received from any suitable pump laser) which is passed multiple times through a laser crystal 310 and respectively reflected back and forth through the crystal 310 by a first prism 340 and a second prism 345. As an alternative, either or both of the prism 340 and the prism 345 may be replaced by an assembly of two flat reflectors oriented at 90 degrees to each other that function together in a manner similar to the two total internal reflection surfaces of the prism 340 and the prism 345. Depending on the details of the geometry, relay-imaging optics may or may not be required. If the beam cross-section dimension d is large enough to ensure that the Fresnel range of the beam, $L_{Fr,0} \sim \pi d^2/\lambda$, exceeds the multi-pass interaction length $L_{tot}$ inside the crystal, i.e. $L_{Fr} > L_{tot}$, then diffraction effects are minor for a collimated input pump beam and relay imaging is not necessary. If this condition is not satisfied, then relay imaging will be required. Although not shown in FIG. 3, relay imaging (for example, as shown in FIG. 2C) may be positioned between the laser crystal 310 and the prisms 340, 345 for example, at the location indicated by arrows 315, 317. Additionally, in particular embodiments, a lens and a prism may be integrated together. For example, the Porro prism 340 and lens 215b of FIG. 2C may be a combination structure. In certain embodiments, the Raman generator 300 includes a spectral filter 330 inserted in the beam path. In certain embodiments, the filter 330 limits the frequency spread of the Stokes-shifted beam relative to the frequency of the pump beam. Frequencies outside the filter band-pass are blocked each round-trip through the crystal 310, leaving only the desired frequency components. In certain embodiments, the filter 330 can be a Fabry-Perot etalon having a narrow passband, or a narrowband birefringence filter, or some other type of filter that provides the required frequency selection. Assuming the pump laser has a broad spectral bandwidth as compared to the filter transmission bandwidth, the filter 330 will have negligible impact on the pump beam as it passes through the Raman generator 300.

In the multi-pass scheme of FIG. 3, there are a total of nine passes through the Raman crystal 310. In this embodiment, the final reflection at the left side propagates directly along the symmetry axis of the crystal 310 and the Porro prism 340. The Porro prism 340 is designed to have an AR-coated flat surface at its right side, which allows this ninth-pass beam to propagate right through the prism 340 without TIR and to exit the prism 315, yielding the output signal 390 to the right. Although the sketch in FIG. 3 only shows the pump beam, the Stokes-shifted beam would follow the same path.

In particular embodiments, the nominal beam diameter is 0.7 mm, and the spacing between successive passes is 1 mm. Nine beam passes can therefore fit within an overall crystal height of 10 mm. Assuming the crystal 310 has a length L and a refractive index n, and referring back to FIG. 2A, the lens focal lengths and spacing between crystals 205-210 can be determined. Given that planes O, O', and O" are relay images of each other that are sequentially spaced by 4f (f is the lens' focal lengths) and the spacing between crystals is defined as $L_x$, the following equation applies:

$$\frac{2L}{n} + L_x = 8f \qquad (1)$$

which can be solved for $L_x/2$:

$$\frac{L_x}{2} = 4f - \frac{L}{n} \qquad (2)$$

With lens focal lengths of 35 mm, a crystal 205 length of 100 mm, and a crystal refractive index of 2, and referring back to FIG. 2C, Equation (2) yields the distance from the right end of the crystal 205 to the image plane O' of $L_x/2$=90 mm. With a nominal 10 mm between lens 215b and the image plane O' and 70 mm between lens 215a and lens 215b, lens 215a is about 10 mm from the right end of the crystal 205. Accordingly, the vertical extent of all nine beams as they enter lenses is about 10 mm, so this lens set is operating at or about f/3.5, which is a relatively simple lens to design. Assuming a comparable optical arrangement on the left side of the crystal 205, the total physical length of the Raman generator module 205 schematically shown in FIG. 3 is about 28 cm, while the total optical path length is about 90 cm.

As alluded to above, in certain embodiments a lens and a Porro prism can be combined to form a single integrated lens-prism. Therefore, each prism can be configured to have a spherical entrance face with a radius of curvature that makes it function as a 35 mm (or other) focal length lens. Utilizing an integrated lens-prism eliminates one component on each side of the crystal. Thus, the entire Raman generator would then include only five components: the crystal, two lenses, and two lens-prism combinations. In embodiments where the filter 330 is included for narrow-band applications, the Raman generator includes a total of six components.

In certain embodiments, the Raman medium is Potassium Gadolinium Tungstate (KGW) with a Raman gain of about 1 cm/GW. In other embodiments, the Raman medium may be other materials. When the laser pump includes a pump intensity of 325 MW/cm$^2$ (i.e. 1 mJ, 0.5 nsec, 0.7 mm beam diameter) and the Raman generator 300 as a total multi-pass path length of 90 cm, the gIL product is 45, which exceeds the Raman threshold. Therefore, the Raman generator module 300 will reach threshold. Additionally, three Raman generators 300 in series will reach about five times that threshold, which yields good conversion efficiency. Alternatively, the pump and signal beams can be folded in a direction normal to the plane of FIG. 3, and then the same optics on either end of the Raman medium can be used to make an additional 9 more passes through the crystal. Folding in this direction one more time yields another 9 passes. Hence, by tripling the package size in the plane normal to FIG. 3, the final package will operate at about five times threshold, while maintaining all of the benefits described above. The principal disadvantage of this final scheme is that the thermal gradients in the direction of the three layers will increase by approximately a factor of 3 relative to the single-layer case. This disadvantage can be addressed by using three separate crystal plates aligned in parallel and separated by cooling inserts.

In certain embodiments, the design for the Raman generator 300 can also include alignment of the beams with respect to the crystal axes, which addresses the second requirement above. The Porro prisms 340, 345 can be fabricated with relatively tight tolerances on the 90 degree angle between the two TIR surfaces. As a result, all of the beam paths in the multi-pass scheme can be either parallel or anti-parallel to each other. Therefore, once the input beam is aligned to have the correct propagation direction and polarization relative to the crystal axes, all of the beam paths may also be so aligned. Furthermore, conventional Porro prisms have a retro-reflection property such that they can be misaligned by rotating within the plane of the drawings without altering any of the beam alignments. The only potential misalignment is in a direction normal to the plane of the figures. Having only a single critical alignment at each end of this configuration makes it highly viable for hardware implementation.

Figure 4:
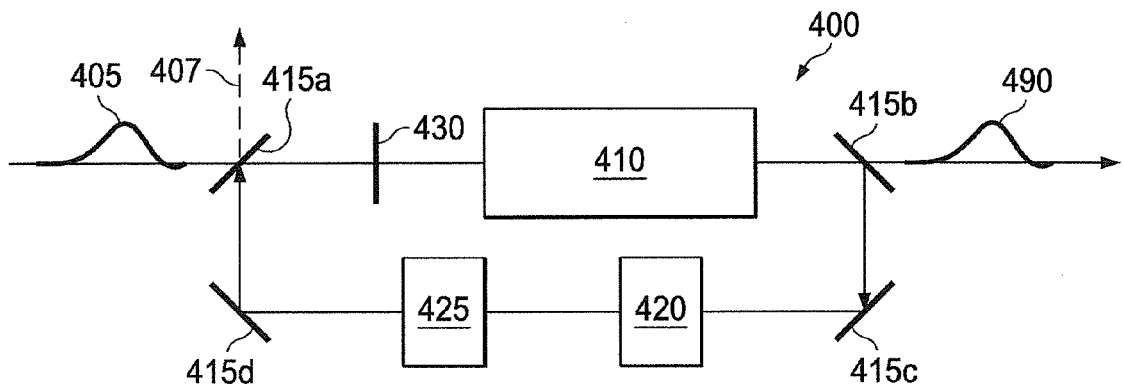
FIG. 4 illustrates a synchronously pumped ring resonator according to an embodiment of the present disclosure.

FIG. 4 illustrates a synchronously pumped ring resonator 400 according to an embodiment of the present disclosure. Although certain details will be provided with reference to the components of the ring resonator 400 of FIG. 4, it should be understood that other embodiments may include more, less, or different components. The ring resonator 400 of FIG. 4 includes a Raman medium 410, a plurality of reflective surfaces 415a-415d, a spectral filter 420, and an etalon 425. As described in more detail below, the ring resonator 400 in this embodiment is configured to receive input pump pulses and to generate output Stokes-shifted pulse(s). In particular embodiments, there may also be a residual pump beam as indicated by dashed line 407.

This embodiment can be beneficial for the specific pump waveform of a mode-locked pulse train. The mode-locked waveform is represented as a periodic sequence of short pulses at a high pulse repetition frequency (PRF). For typical conditions, the pulse duration, $\tau_p$, is a few psec, with a time interval T between pulses of a few nanoseconds. The interpulse period is selected to match the resonator transmission time, T=c/Lr, where Lr is the one-way distance around the ring resonator.

A laser pump provides a train of light pulses 405 at a pump wavelength λ, to the ring resonator 400. For example, the laser pump can provide a pulse every 10 ns with a pulse duration ($\tau_p$) of 1 psec. The pulse propagates through a first reflective surface (e.g., a dichroic mirror) 415a. The first mirror 415a can be disposed at a 45° angle with respect to the path of the pulse. Additionally, the first mirror 415a may be configured to allow the pulse to pass through the mirror 415a. The pulse is then passed through a transverse mode selector 430, which limits angular spread into the Raman medium 410. The Raman medium 410 outputs a low intensity Stokes-shifted beam, such as with an efficiency of $10^{-8}$, to the second mirror 415b. The second mirror 415b can be configured to pass a portion of the Stokes-shifted beam and reflect the remainder of the Stokes-shifted beam along with all other beams. For example, the second mirror 415b can be a dichroic mirror. The beam traverses a path that includes the third mirror 415c, spectral filter 420, etalon 425, and fourth mirror 415d back to the first mirror 415a.

The spectral filter 420 filters undesired wavelengths. For example, the spectral filter 420 is configured to prevent the generation of higher-order Stokes-shifted pulses that otherwise could be generated and deplete the first-Stokes intensity when the Raman conversion efficiency becomes high.

The etalon 425 enables a selection of modes for the Stokes-shifted beam. The etalon 425 can be a Fabry-Perot etalon configured to select a specific Raman wavelength within the overall Raman gain band, such as if narrowband operation of the Raman converter is needed.

The path length is configured such that the Stokes-shifted beam substantially coincides with the next pulse generated by the pump laser. The Stokes-shifted beam continues to cycle through the ring resonator 400, coinciding with the subsequent input pump pulses. Each time the Stokes-shifted beam passes through the resonator a portion is transmitted through the second mirror 415b to form a Stokes-shifted output pulse at wavelength $\lambda_s$.

The Raman process efficiency is controlled by the pump intensity inside nonlinear Raman medium 410. The Raman process efficiency can be boosted up exponentially if the pump power increases. Since the mode-locked optical power is concentrated as a sequence of short high-power pulses (that is, with a temporal duty cycle <<1), the peak power within the pulse can greatly exceed the average power by two to three orders of magnitude, which results in improved Raman conversion efficiency.

For a mode-locked pump, Raman conversion occurs in the forward direction in a specific regime when short pump and Stokes-shifted pulses run through the nonlinear medium together, with good overlap both in space and in time. The Raman conversion occurs as a result of the interaction between these two pulses only, having no direct participation from other pulses. The lifetime of the medium vibrations responsible for the Raman process, which is given by the inverse of the Raman bandwidth $\Delta v_R$, is usually much shorter than the interval T between pulses, $(T\Delta v_R)^{-1} \ll 1$. As such, no memory is required in the medium about events induced by preceding pulses when new pulses arrive, other than that preceding pulses have systematically contributed to the energy contained in the Stokes-shifted pulse.

In certain embodiments of the pulse-train Raman mode in the ring resonator 400, the interaction between the pump and Stokes-shifted beams can be as efficient as the steady-state interaction between a continuous wave (CW) pump and Stokes-shifted beams. In order to maintain the pulse-train efficiency of the pulsed waveform at a level comparable to that of the CW waveform, the following conditions can occur substantially simultaneously in certain embodiments:

1. The pulse duration $\tau_p$ can be long, $\tau_p \Delta v_R \gg 1$, compared to the Raman vibrational lifetime.
2. The group velocity difference, $\Delta V_{gr} = V_{pump} - V_{stokes}$, can be small enough after passing the Raman interaction length $L_{int}$, $L_{int}(\Delta V_{gr}/V_{gr}) \ll \tau_p V_{gr}$, to neglect the Raman-pulse temporal walk-off, which can happen for ultra-short pulses because of medium dispersion.
3. The Group Velocity Dispersion (GVD) can be small enough to avoid a peak-intensity reduction due to pulse spreading over the interaction length, $(d^2k/d\omega^2) \ll \tau_p^2/L_{int}$.

For most of the Raman-efficient solid-state media, these three conditions are safely satisfied if the pulse duration $\tau_p$ exceeds about 30 ps. For silicon (Si) crystals, for example, which are of basic interest for mid-IR Raman conversion applications, the vibrational lifetime amounts to about thirty times less, $1/\Delta v_R \sim 1$ ps. For 30 ps transform-limited pulses in Si, the walk-off distance where the pulses synchronous at the input become time-separated by more than the pulse duration amounts to about 75 cm, which is much longer than any Si crystal ever grown to date. Dispersion-induced pulse spreading in Si for wavelengths above 2 µm is pretty slow and measures in hundreds of meters for 30 ps pulses, so it can be neglected as well. That is, a typical mode-locking regime with about 30 ps pulses appears to be a "sweet spot" for Raman conversion, so that the pulse-train mode is automatically as efficient as the truly CW mode, but with conversion efficiency given by the peak power instead of average power, which represents a two-to-three orders of magnitude improvement in terms of effective Raman gain.

The conditions 1-3 listed immediately above optimize the generation of the Stokes-shifted pulse train. However, the scheme of FIG. 4 can still be applied if the conditions are not met. If the pulse duration is shorter than the lifetime, $\tau_p \Delta v_R < 1$, the synchronously pumped ring resonator can still function, but at higher power threshold because the Raman scattering will be developing in a transient regime. Moreover, the dispersion walk-off effect can be partially compensated by matching the round-trip time to the time interval between the pulses. This can be done by tuning the ring-resonator length to account for the difference in propagation time for pump and Stokes-shifted pulses through the crystal.

The ring resonator 400 yields a high Raman conversion efficiency even for conditions that do not produce a high conversion efficiency in a single-pass Raman generator. Specifically, a single-pass Raman generator illuminated by a pump intensity, $I_p$, and containing a Raman medium with a Raman gain coefficient g and having a length of $L_{int}$ will only achieve efficient conversion to the Stokes-shifted wavelength when the gain factor, $M = gI_p L_{int}$, is sufficiently high, such as M>100. The need for this high gain factor arises from the fact that the Stokes-shifted signal comprises the very low power spontaneous Raman noise that amounts in typical conditions to about exp(−25) of the pump power. This very weak noise is amplified by an exponential gain factor of $M_{thr}$ (such as about 25) to reach the Raman threshold, and at least four to five times stronger than that to provide good conversion efficiency. For the best expected values of relevant parameters g=10 cm/GW and $L_{int}$=10 cm in order to meet this condition, the pump peak intensity $I_p$ should be about 1 GW/cm². The long interaction length $L_{int}$=10 cm establishes a limit on the focused-pump spot area A inside a bulk nonlinear medium, $A > \lambda L_{int} \sim 10^{-3}$ cm², which means that the peak power for a single pulse should exceed 1 MW. This is almost four orders of magnitude above the available peak power for standard picosecond-range mode-locked lasers. Under these conditions, the order-of-magnitude improvement given by the multi-pass geometry of the compact Raman generator 300 of FIG. 3, which is very efficient for typical nanosecond-range Q-switched laser pulses, still can be inadequate. The situation is quite different for the ring resonator 400. In this case, the Stokes seed power coincident with each pump pulse that enters the Raman medium is greater than that of the Stokes seed for the preceding pump pulse, and this progression continues until the Stokes seed finally reaches the level that it begins to extract at least 50% of the pump power on a single pass through the Raman medium.

In certain embodiments, the ring resonator 400 includes a ring resonator length that is matched to the resonator length of the pump laser. The Stokes-shifted pulse is excited by a pump pulse and travels together with the pump pulse through the active medium 410. Then, the Stokes-shifted beam returns back to the input after the resonator transmission time. For matched cavity lengths, the Stokes-shifted pulse arrives at substantially the same moment as when the next pump pulse is delivered. The returned Stokes-shifted pulse serves as a Raman seed for the next pump pulse such that the stimulated scattering process for the second pump pulse starts from a strong Stokes-shifted signal instead of a weak spontaneous seed. The Raman threshold drops down significantly for the second and subsequent pulses. For the ring resonator 400, the threshold is defined by the condition of overall gain for Stokes-shifted radiation per trip around the resonator: $M_{thr} = l_n(1/R_r)$, where $R_r$ is the effective one-way transmission of the resonator controlled mostly by the out-coupler reflectivity $R_{out}$, Fresnel reflections on surfaces, and optical absorption in the optical components of the cavity. Practical values for the resonator transmission, $R_r$, is between about 0.7 to about 0.9, provide good enough Raman conversion efficiency but at a Raman threshold that is reduced by two orders of magnitude.

The out-coupling can be achieved with a dichroic mirror 415b that transmits the pump and only a fraction of the Stokes-shifted beam. Alternatively, the out-coupling can be achieved using different polarization states for the pump light and the Stokes-shifted light in the ring resonator 400. The two tilted optical surfaces that are crossed by the linearly polarized pump pulse would be set to transmit the pump polarization but reflect the Stokes-shifted pulses, which would be forced to operate at the orthogonal polarization. Most of the Raman-active solid-state media allow pump and Stokes-shifted waves to interact and form stimulated Raman scattering gain even if the two waves are linearly polarized orthogonally to each other.

In certain embodiments, the ring resonator 400 includes a spatial filter. The spatial filter can be set inside to reduce the Fresnel number of the resonator to a low value that helps limit the Stokes-shifted output beam to a diffraction-limited output.

In certain embodiments, the active medium 410 can be a long waveguide. Such a waveguide is useful since a long waveguide can be made with a very small cross-sectional area but support high intensity of the pump beam over much longer distance than if the same pump beam were focused into a bulk Raman medium. Such waveguide technology has been matured in recent years for crystalline Si; it is referred to as "ridge waveguide" technology. These waveguides are usually highly multimode because of the strong index difference of the Si with respect to any cladding. For this reason, the waveguides can support propagation of a few independent laser paths, which is useful for scaling up output power of the converter. If desired, an aperture in the ring resonator 400 can cut off any undesired higher-order modes for the generated Stokes-shifted signal, thereby providing single-mode operation for multi-mode and incoherent pumping.

Figure 5:
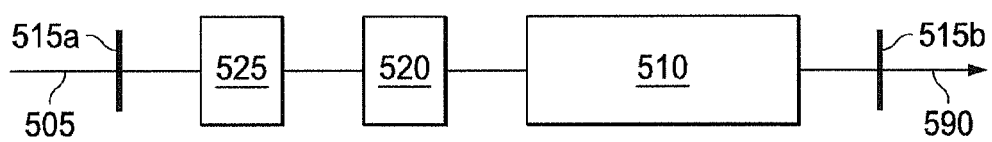
FIG. 5 illustrates a synchronously pumped linear resonator, according to an embodiment of the present disclosure.

FIG. 5 illustrates a synchronously pumped linear resonator 500, according to an embodiment of the present disclosure. Although certain details will be provided with reference to the components of the linear resonator 500 of FIG. 5, it should be understood that other embodiments may include more, less, or different components. The linear resonator 500 of FIG. 5 includes a Raman medium 510, a plurality of reflective surfaces 515a-515b, a spectral filter 520, and an narrowband spectral filter 525. As described in more detail below, the linear resonator 500 in this embodiment is configured to receive input pump pulses 505 and to generate output Stokes-shifted pulse(s) 590.

This embodiment offers many of the benefits of the ring resonator 400 of FIG. 4, but with fewer parts and a simpler geometry. Specifically, as with ring resonator 400, linear resonator 500 is configured to receive the specific pump waveform of a mode-locked pulse train, as defined earlier in connection with ring resonator 400. Furthermore, linear resonator 500 is specified such that the inter-pulse period, T, of the pulse train matches twice the linear resonator transmission time, $T=2c/Lr$, where Lr is the one-way length of the linear resonator. In this case, a Stokes-shifted pulse that starts to grow under the influence of a single pump pulse within the linear resonator will continue to grow under the influence of subsequent pump pulses until the Stokes-shifted pulse grows to a level of at least 50% of the energy of a pump pulse.

In certain embodiments, the Raman generator 500 includes a spectral filter 520 which filters undesired wavelengths. For example, configuring spectral filter 520 to efficiently pass the pump and Stokes-shifted wavelengths but to block any longer wavelengths will prevent the generation of higher-order Stokes-shifted pulses that otherwise could be generated and deplete the first-Stokes intensity when the Raman conversion efficiency becomes high. The filter 520 can be a birefringence filter, or some other type of filter that provides the required frequency selection.

In certain embodiments, the Raman generator 500 includes a narrowband spectral filter 525 inserted in the beam path. The filter 525 enables a selection of modes for the Stokes-shifted beam. The filter 525 can be a Fabry-Perot etalon, or some other type of filter that provides the required frequency selection. Assuming the pump laser has a broad spectral bandwidth as compared to the filter bandwidth, the filter 525 will have negligible impact on the pump beam as it passes through the Raman generator 500.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A Raman generator comprising:
a Raman medium configured to receive a pump pulse at a first wavelength and shift at least a portion of the pump pulse's energy or power into a Stokes-shifted pulse at a second wavelength; and
one or more optical elements configured to synchronize one or more subsequent passages of the Stokes-shifted pulse through the Raman medium with one or more subsequent pump pulses at the first wavelength to thereby increase a power of the Stokes-shifted pulse;
wherein the Raman medium has a length that avoids achieving a Raman threshold for stimulated Raman scattering during a single pass through the Raman medium.

2. The Raman generator of claim 1, wherein the one or more optical elements are configured to synchronize the one or more subsequent passages of the Stokes-shifted pulse with the one or more subsequent pump pulses by routing the Stokes-shifted pulse from an output of the Raman medium back to an input of the Raman medium.

3. The Raman generator of claim 2, wherein the one or more optical elements are configured to route the Stokes-shifted pulse from the output of the Raman medium back to the input of the Raman medium by sending the Stokes-shifted pulse directly through the Raman medium.

4. The Raman generator of claim 2, wherein the one or more optical elements are configured to route the Stokes-shifted pulse from the output of the Raman medium back to the input of the Raman medium by bypassing the Raman medium.

5. The Raman generator of claim 1, wherein the one or more optical elements are configured to pass the Stokes-shifted pulse multiple times along a same direction through the Raman medium.

6. The Raman generator of claim 1, wherein the one or more optical elements are configured to synchronize the Stokes-shifted pulse with multiple subsequent pump pulses during multiple subsequent passages of the Stokes-shifted pulse through the Raman medium.

7. The Raman generator of claim 1, wherein the one or more optical elements comprise at least two mirrors.

8. The Raman generator of claim 1, wherein the one or more optical elements comprise at least four mirrors.

9. The Raman generator of claim 1, further comprising:
a transverse mode selector configured to limit an angular spread of the Stokes-shifted pulse into the Raman medium.

10. The Raman generator of claim 1, further comprising,
a spectral filter configured to control a spectral width of the Stokes-shifted pulse.

11. The Raman generator of claim 1, further comprising,
a spectral filter configured to suppress multi-Stokes signal generation beyond a specified number of Stokes shifts.

12. The Raman generator of claim 1, further comprising:
an optical element configured to limit a diffractive beam spreading of a Stokes-shifted output beam.

13. The Raman generator of claim 1, wherein the Raman generator is configured such that the Stokes-shifted pulse, after multiple passes through the Raman medium, has an energy that is greater than or equal to fifty percent of the energy of the pump pulse.

14. A method comprising:
- passing a pump pulse at a first wavelength through a Raman medium to shift at least a portion of the pump pulse's energy or power into a Stokes-shifted pulse at a second wavelength; and
- synchronizing one or more subsequent passages of the Stokes-shifted pulse through the Raman medium with one or more subsequent pump pulses at the first wavelength to thereby increase a power of the Stokes-shifted pulse;
- wherein the Raman medium has a length that avoids achieving a Raman threshold for stimulated Raman scattering during a single pass through the Raman medium.

15. The method of claim 14, wherein synchronizing the one or more subsequent passages of the Stokes-shifted pulse with the one or more subsequent pump pulses comprises:
- routing the Stokes-shifted pulse from an output of the Raman medium back to an input of the Raman medium.

16. The method of claim 15, wherein routing the Stokes-shifted pulse from the output of the Raman medium back to the input of the Raman medium comprises:
- sending the Stokes-shifted pulse directly through the Raman medium.

17. The method of claim 15, wherein routing the Stokes-shifted pulse from the output of the Raman medium back to the input of the Raman medium comprises:
- bypassing the Raman medium with a plurality of optical elements.

18. The method of claim 14, wherein the Stokes-shifted pulse is synchronized with multiple subsequent pump pulses during multiple subsequent passages of the Stokes-shifted pulse through the Raman medium.

19. The method of claim 14, further comprising:
- limiting diffractive spreading of at least one of: the pump pulse and the Stokes-shifted pulse.

20. The method of claim 14, wherein the Stokes-shifted pulse, after multiple passes through the Raman medium, has an energy that is greater than or equal to fifty percent of the energy of the pump pulse.

21. A system comprising:
- a laser configured to generate a pump pulse at a first wavelength and one or more subsequent pump pulses at the first wavelength; and
- a Raman generator comprising:
  - a Raman medium configured to shift at least a portion of the pump pulse's energy or power into a Stokes-shifted pulse at a second wavelength; and
  - one or more optical elements configured to synchronize one or more subsequent passages of the Stokes-shifted pulse through the Raman medium with the one or more subsequent pump pulses to thereby increase a power of the Stokes-shifted pulse;
- wherein the Raman medium has a length that avoids achieving a Raman threshold for stimulated Raman scattering during a single pass through the Raman medium.

* * * * *